US008271350B2

(12) United States Patent
Lao et al.

(10) Patent No.: US 8,271,350 B2
(45) Date of Patent: Sep. 18, 2012

(54) METHOD AND SYSTEM FOR AUTOMATICALLY PUBLISHING CONTENT

(75) Inventors: Guillermo Lao, Torrance, CA (US); Ralph H. Brenner, Jr., Los Angeles, CA (US); Daniel C. Chen, Torrance, CA (US); Aram Nahidipour, Laguna Niguel, CA (US); Edgardo Valenzuela, South Gate, CA (US); Mark Berchowitz, Los Angeles, CA (US); Ivy Y. Chen, Torrance, CA (US); Xin Wang, Torrance, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 889 days.

(21) Appl. No.: 11/957,018

(22) Filed: Dec. 14, 2007

(65) Prior Publication Data

US 2008/0091462 A1 Apr. 17, 2008

Related U.S. Application Data

(63) Continuation of application No. 09/788,500, filed on Feb. 21, 2001, now Pat. No. 7,343,324.

(60) Provisional application No. 60/245,203, filed on Nov. 3, 2000.

(51) Int. Cl.
*G06Q 30/00* (2012.01)
(52) U.S. Cl. ........ 705/26.41; 705/26.1; 705/51; 705/57; 705/59
(58) Field of Classification Search ............... 705/26–27, 705/51–59, 26.1–27.2
See application file for complete search history.

(56) References Cited

U.S. PATENT DOCUMENTS

| | | | |
|---|---|---|---|
| 3,263,158 A | 7/1966 | Bargen et al. |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |

(Continued)

FOREIGN PATENT DOCUMENTS

BR 9810967 A 10/2001

(Continued)

OTHER PUBLICATIONS

"ContentGuard Launches eBook Practice for Online Bookstores and Publishers", Business Wire. Aug. 29, 2000 [recovered from Dialog database on Sep. 10, 2007].

(Continued)

*Primary Examiner* — William Allen
(74) *Attorney, Agent, or Firm* — Marc S. Kaufman; Stephen M. Hertzler; Reed Smith LLP

(57) ABSTRACT

The publishing system and method automates at least some portion of a publishing process. The system publishes content using metadata, rights templates and/or specifications, publishing profiles and business rules.

15 Claims, 12 Drawing Sheets

U.S. PATENT DOCUMENTS

| | | |
|---|---|---|
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Hellman |
| 4,713,753 A | 12/1987 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,848,413 A | 12/1998 | Wolff |
| 5,850,433 A | 12/1998 | Rondeau |
| 5,884,280 A | 3/1999 | Hasegawa et al. |
| 5,892,900 A * | 4/1999 | Ginter et al. .................... 726/26 |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,987,134 A | 11/1999 | Shin et al. |
| 5,999,624 A | 12/1999 | Hopkins |
| 5,999,949 A | 12/1999 | Crandall |
| 6,006,332 A | 12/1999 | Rabne et al. |
| 6,009,525 A | 12/1999 | Horstmann |
| 6,012,890 A | 1/2000 | Cetorio Garrido |
| 6,020,882 A | 2/2000 | Kinghorn et al. |
| 6,047,067 A | 4/2000 | Rosen |
| 6,073,234 A | 6/2000 | Kigo et al. |
| 6,091,777 A | 7/2000 | Guetz et al. |
| 6,112,181 A | 8/2000 | Shear et al. |

| | | | | | | |
|---|---|---|---|---|---|---|
| 6,112,239 | A | 8/2000 | Kenner et al. | EP | 0 679 977 A1 | 11/1995 |
| 6,115,471 | A | 9/2000 | Oki et al. | EP | 0 715 243 A1 | 6/1996 |
| 6,135,646 | A | 10/2000 | Kahn et al. | EP | 0 715 244 A1 | 6/1996 |
| 6,138,119 | A | 10/2000 | Hall et al. | EP | 0 715 245 A1 | 6/1996 |
| 6,141,754 | A | 10/2000 | Choy | EP | 0 725 376 | 8/1996 |
| 6,157,719 | A | 12/2000 | Wasilewski et al. | EP | 0 731 404 A1 | 9/1996 |
| 6,157,721 | A | 12/2000 | Shear et al. | EP | 0 763 936 A2 | 3/1997 |
| 6,169,976 | B1 | 1/2001 | Colosso | EP | 0 818 748 A2 | 1/1998 |
| 6,185,683 | B1 | 2/2001 | Ginter et al. | EP | 0 840 194 A2 | 5/1998 |
| 6,189,037 | B1 | 2/2001 | Adams et al. | EP | 0 892 521 A2 | 1/1999 |
| 6,189,146 | B1 | 2/2001 | Misra et al. | EP | 0 934 765 A1 | 8/1999 |
| 6,209,092 | B1 | 3/2001 | Linnartz | EP | 0 946 022 A2 | 9/1999 |
| 6,216,112 | B1 | 4/2001 | Fuller et al. | EP | 0 964 572 A1 | 12/1999 |
| 6,219,652 | B1 | 4/2001 | Carter et al. | EP | 1 103 922 A2 | 5/2001 |
| 6,226,618 | B1 | 5/2001 | Downs et al. | GB | 1483282 | 8/1977 |
| 6,233,684 | B1 | 5/2001 | Stefik et al. | GB | 2022969 A | 12/1979 |
| 6,236,971 | B1 | 5/2001 | Stefik et al. | GB | 2 136 175 | 9/1984 |
| 6,237,786 | B1 | 5/2001 | Ginter et al. | GB | 2 236 604 | 4/1991 |
| 6,240,185 | B1 | 5/2001 | Van Wie et al. | GB | 2236604 A | 4/1991 |
| 6,253,193 | B1 | 6/2001 | Ginter et al. | GB | 2309364 A | 7/1997 |
| 6,263,313 | B1 | 7/2001 | Milsted et al. | GB | 2316503 A | 2/1998 |
| 6,266,618 | B1 | 7/2001 | Ye et al. | GB | 2354102 A | 3/2001 |
| 6,292,569 | B1 | 9/2001 | Shear et al. | JP | 62-241061 | 10/1987 |
| 6,301,660 | B1 | 10/2001 | Benson | JP | 64-068835 | 3/1989 |
| 6,307,939 | B1 | 10/2001 | Vigarie | JP | 3063717 A | 3/1991 |
| 6,327,652 | B1 | 12/2001 | England et al. | JP | 04-369068 | 12/1992 |
| 6,330,670 | B1 | 12/2001 | England et al. | JP | 5-100939 | 4/1993 |
| 6,345,256 | B1 | 2/2002 | Milsted et al. | JP | 5168039 A2 | 7/1993 |
| 6,353,888 | B1 | 3/2002 | Kakehi et al. | JP | 05-268415 | 10/1993 |
| 6,363,488 | B1 | 3/2002 | Ginter et al. | JP | 6131371 A | 5/1994 |
| 6,389,402 | B1 | 5/2002 | Ginter et al. | JP | 06-175794 | 6/1994 |
| 6,397,333 | B1 | 5/2002 | Söhne et al. | JP | 06-215010 | 8/1994 |
| 6,401,211 | B1 | 6/2002 | Brezak, Jr. et al. | JP | 07-084852 | 3/1995 |
| 6,405,369 | B1 | 6/2002 | Tsuria | JP | 07-200317 | 8/1995 |
| 6,424,717 | B1 | 7/2002 | Pinder et al. | JP | 07-244639 | 9/1995 |
| 6,424,947 | B1 | 7/2002 | Tsuria et al. | JP | 0 715 241 | 6/1996 |
| 6,466,920 | B1 | 10/2002 | Okayama et al. | JP | 11031130 A2 | 2/1999 |
| 6,487,659 | B1 | 11/2002 | Kigo et al. | JP | 11032037 A2 | 2/1999 |
| 6,516,052 | B2 | 2/2003 | Voudouris | JP | 11205306 A2 | 7/1999 |
| 6,516,413 | B1 | 2/2003 | Aratani et al. | JP | 11215121 A2 | 8/1999 |
| 6,523,745 | B1 | 2/2003 | Tamori | JP | 2000215165 A2 | 8/2000 |
| 6,578,008 | B1 | 6/2003 | Chacker | JP | 2005218143 A2 | 8/2005 |
| 6,587,837 | B1 | 7/2003 | Spagna et al. | JP | 2005253109 A2 | 9/2005 |
| 6,796,555 | B1 | 9/2004 | Blahut | JP | 2006180562 A2 | 7/2006 |
| 6,938,021 | B2 | 8/2005 | Shear et al. | WO | WO 83/04461 A1 | 12/1983 |
| 7,031,943 | B1 * | 4/2006 | James et al. ............... 705/59 | WO | WO 92/20022 | 11/1992 |
| 7,043,488 | B1 | 5/2006 | Baer et al. | WO | WO 92/20022 A1 | 11/1992 |
| 7,343,324 | B2 * | 3/2008 | Lao et al. ............... 705/26 | WO | WO 93/01550 | 1/1993 |
| 2001/0009026 | A1 | 7/2001 | Terao et al. | WO | WO 93/01550 A1 | 1/1993 |
| 2001/0011276 | A1 | 8/2001 | Durst Jr. et al. | WO | WO 93/11480 A1 | 6/1993 |
| 2001/0014206 | A1 | 8/2001 | Artigalas et al. | WO | WO 94/01821 | 1/1994 |
| 2001/0037467 | A1 | 11/2001 | O'Toole, Jr. et al. | WO | WO 94/03003 A1 | 2/1994 |
| 2001/0039659 | A1 | 11/2001 | Simmons et al. | WO | WO 96/13814 A1 | 5/1996 |
| 2002/0001387 | A1 | 1/2002 | Dillon | WO | WO 96/24092 | 8/1996 |
| 2002/0035618 | A1 | 3/2002 | Mendez et al. | WO | WO 96/24092 A2 | 8/1996 |
| 2002/0044658 | A1 | 4/2002 | Wasilewski et al. | WO | WO 96/27155 A2 | 9/1996 |
| 2002/0056118 | A1 | 5/2002 | Hunter et al. | WO | WO 97/25800 A1 | 7/1997 |
| 2002/0069282 | A1 | 6/2002 | Reisman | WO | WO 97/37492 A1 | 10/1997 |
| 2002/0099948 | A1 | 7/2002 | Kocher et al. | WO | WO 97/41661 A2 | 11/1997 |
| 2002/0127423 | A1 | 9/2002 | Kayanakis | WO | WO 97/43761 A2 | 11/1997 |
| 2003/0097567 | A1 | 5/2003 | Terao et al. | WO | WO 97/48203 | 12/1997 |
| 2004/0052370 | A1 | 3/2004 | Katznelson | WO | WO 98/09209 A1 | 3/1998 |
| 2004/0172552 | A1 | 9/2004 | Boyles et al. | WO | WO 98/10561 A1 | 3/1998 |
| | | | | WO | WO 98/11690 | 3/1998 |
| | | FOREIGN PATENT DOCUMENTS | | WO | WO 98/11690 A1 | 3/1998 |
| EP | | 0 067 556 B1 | 12/1982 | WO | WO 98/19431 A1 | 5/1998 |
| EP | | 0 084 441 | 7/1983 | WO | WO 98/42098 | 9/1998 |
| EP | | 0 180 460 | 5/1986 | WO | WO 98/43426 A1 | 10/1998 |
| EP | | 0 257 585 A2 | 3/1988 | WO | WO 98/45768 A1 | 10/1998 |
| EP | | 0 262 025 A2 | 3/1988 | WO | WO 99/24928 A2 | 5/1999 |
| EP | | 0 332 304 A2 | 9/1989 | WO | WO 99/34553 A1 | 7/1999 |
| EP | | 0 332 707 | 9/1989 | WO | WO 99/35782 A1 | 7/1999 |
| EP | | 0 393 806 A2 | 10/1990 | WO | WO 99/48296 A1 | 9/1999 |
| EP | | 0 450 841 A2 | 10/1991 | WO | WO 99/49615 | 9/1999 |
| EP | | 0 529 261 A2 | 3/1993 | WO | WO 99/60461 A1 | 11/1999 |
| EP | | 0 613 073 A1 | 8/1994 | WO | WO 99/60750 A2 | 11/1999 |
| EP | | 0 651 554 | 5/1995 | WO | WO 00/04727 A2 | 1/2000 |
| EP | | 0 668 695 | 8/1995 | WO | WO 00/05898 A2 | 2/2000 |
| EP | | 0 678 836 A1 | 10/1995 | WO | WO 00/46994 A1 | 8/2000 |

| | | |
|---|---|---|
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

European Search Report dated May 25, 2004 (European Patent Application No. 01 97 9833).
Business Editors, "Upstart tTechnology Firm iUniverse.com Unveils Plans to Revutionize Publishing World", Business Wire. New York: Oct. 18, 1999 [receovered from proquest Oniline Database Jun. 21, 2006].
Beck, Rachel. "Barnes and Noble Bus intoiUnierse". Seattle Post-intelligencer. Washington: Nov. 3, 1999. [receovered form Proquest Online Database Jun. 21, 2006].
www.iUniveres.com [online] Jan. 16, 2000 [retrieved Jun. 21, 2006], Recovered from the internet Archive Wayback machine at www.archive.org. <URL: http://www.iuniverse.com>.
Caney, Derek. "Barnes and Noble buys stake web publisher iUniverse". Pittsburgh Post-Gazette. Pennsylvania: Nov. 3, 1999. [receovered from proquest Online Database Jun. 21, 2006].
Beizer, Doug. "Web site sells books printed to order, and it's a boon for readers and authors instant books". Virginian-Pilot. Virginia: Sep. 4, 2000. [receovered from Proquest Online Database Jun. 21, 2006].
Conhaim, Wallys W. "The e-publishing revolution". Link-Up. Medford: Mar./Apr. 2000. vol. 17, Iss. 2. [receovered form Proquest Online Database Jun. 21, 2006].
International Search Report dated Dec. 17, 2001; Form PCT/ISA/220, Form PCT/ISA/210, (total 5 pages).
"National Semiconductor and EPR Partner for Information Metering/Data Security Cards"Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990. The Transactions of the IEICE, Vo. E 73, No. 7, Tokyo, JP.
Weber, R., "Metering Technologies for Digital Intellectual Property", pp. 1-29, Oct. 1994, A Report to the International Federation of Reproductions Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionaize Software Pricing and Distribution; Wave Systems Corp." pp. 1-3, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue I.
Sirbu, M., "Internet Billing Service Design and prototype Implementation", pp. 67-80, Jan. 1994, IMA Intellectual Property Project Proceedings, vol. 1, Issue 1.
Simmell, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", pp. 1-24, 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multimedia Environment", Apr. 2-3, 1993, Knowbots, Permissions Headers & Contract Law.
Johnson et al., "A Secure Distributed Capability Based System," Proceedings of the 1985 ACM Annual Conference on the Range of Computing: MID-80's Perspective: MID-80'S Perspective *Association for Computing Machinery* pp. 392-402 (1985).
Delaigle, "Digital Watermarking," Spie Conference in Optical Security and Counterfeit Deterrence Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3, 1993).
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" Draft (Online) (Nov. 2, 1997) XT002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, Nsw, Australia, Jul. 7-9, 1997, Berlin, Germany, Springer-Verlag, Germany), XP008016393 ISBN: 3-540-63232-8.

Mambo et al, "Proxy Cryptosysrems: Delegation of the Power to Decrypt Ciphertexts,", IEICE Trans. Fundamentals Vol. E80-A, No. 1:54-63 (Jan. 1997) XP00742245 ISSN: 0916-8508.

Microsoft Word, Users Guide, Version 6.0, pp. 487-89, 549-55, 560-64, 572-75, 599-613, 616-31 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-72, 593-94 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-64 (no date).

O'Driscoll, The Essential Guide to Digital Set-Top Boxes and Interactive TV, pp. 6-24 (no date).

IUS Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-55 (no date).

No Author, "Part Four Networks," No Title, pp. 639-714 (no date).

Microsoft Word User's Guide, pp. 773-74, 315-16, 487-89, 561-64, 744, 624-33 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wild/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006).

Online Search Results for "inverted file", "inverted index" from www.techweb.com, www.cryer.co.uk, computing-dictionary.thefreedictionary.com, www.nist.gov.en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

\* cited by examiner

FIG. 12

Edit Product

47 Records    Page: 1 of 4
« < > »  Requery

| # | Sku | Name | Price |
|---|---|---|---|
| 1 | 5 | My Bondage and My Freedom | $2.00 |
| 2 | 6 | Dracula | $2.00 |
| 3 | 7 | The Importance of Being Earnest | $3.00 |
| 4 | 8 | Great Expectations | $5.00 |
| 5 | 9 | The Innocence of Father Brown | $2.00 |
| 6 | 10 | Wuthering Heights | $5.00 |
| 7 | 11 | Three Men in a Boat | $2.00 |
| 8 | 12 | Kai Lung's Golden Hours | $2.00 |
| 9 | 13 | The Legend of Sleepy Hollow | $3.00 |
| 10 | 14 | Day of the Triffids | $10.00 |
| 11 | 15 | Little Women | $3.25 |
| 12 | 16 | Extraordinary Popular Delusions and the Madness of Crowds | $3.50 |
| 13 | 17 | The Prince | $1.75 |
| 14 | 18 | Encarta Pocket Dictionary | $4.00 |
| 15 | 19 | Peter Pan | $3.25 |

1200, 1202, 1204

METHOD AND SYSTEM FOR AUTOMATICALLY PUBLISHING CONTENT

CROSS-REFERENCE TO RELATED APPLICATIONS

This application is a continuation of application Ser. No. 09/788,500 filed on Feb. 21, 2001, which issued on Mar. 11, 2008 as U.S. Pat. No. 7,343,324 entitled "Method and System for Automatically Publishing Content," which claims priority from U.S. Provisional Patent Application Ser. No. 60/245,203 entitled "System and Apparatus for Electronic Publishing of Digital Content with Digital Rights Management Capability" filed on Nov. 3, 2000. These applications are all incorporated by reference in their entirety.

BACKGROUND OF THE INVENTION

1. Field of The Invention

The present invention relates to a method and system for publishing content and, more particularly, to a method and system for automatically publishing content over the Internet, other communications networks or conventional delivery channels.

2. Background of the Invention

Rapid evolution and wide deployment has occurred for computers, and other electronic devices such as cellular phones, pagers, PDAs, and e-book readers, and these devices are interconnected through communication links including the Internet, intranets and other networks. These interconnected devices are especially conducive to publication of content electronically. The process of making content available from authors and/or publishers to distributors over the Internet, intranets and other networks is known as "electronic publishing." Many systems have been developed through which publishers and distributors can advertise, distribute and sell content. This content can include items such as documents, e-books, music, video, games and software, that are delivered electronically to consumers over networks or on tangible media such as paper documents, books, CDs, Video CDs, DVDs, floppy disks and magnetic tapes that are delivered through conventional distribution channels such as through a common carrier. In general, content includes anything that may be distributed electronically or may be distributed in a tangible media. A publishing or distribution system may provide a catalog that lists the content that is available. A user, who is a potential content consumer, may browse through the catalog, select desired content, rights to view, print or extract the content and the like, and conditions upon which the rights may be contingent such as payment, identification, time period, or the like. After the user has completed selecting and ordering the content, the publishing or distribution system then instructs the delivery of the content to the recipient either electronically from some content repository or via a conventional distribution channel such as tangible media sent via a common carrier.

Very often, publishing of content from a publisher to its distributors and then to consumers is time consuming and cumbersome. A typical scenario is that after preparing content, the publisher manually informs its distributors that the content is ready to be distributed. The distributors manually determine whether they want to distribute the content. If a distributor wants to distribute the content, then the distributor manually contacts the publisher and the content, together with its metadata (identification and descriptive data) and a rights specification (i.e. the access or usage rights and accompanying conditions), is then manually transferred to the distributor's system. The distributor then manually brands the content with its business rules and makes the content available for consumers to select by, for example, manually listing the content in a catalog. The business rules generally include the rules and procedures used by a distributor to decide which content that the particular distributor wants to distribute. In many situations, this process of informing, transferring, branding, cataloging and displaying content is accomplished by multiple human interactions on a content-by-content basis. Not only does this process consume valuable human resources and delay the time to market the content, but this process also introduces vulnerabilities by allowing people to mishandle and misuse the content.

SUMMARY OF THE INVENTION

An embodiment of the invention provides a method and system to automate the process of publishing items of content from publishers to distributors who then make the content available to consumers. An embodiment may organize a group of publishers, a group of distributors and some intermediate facilitators. Facilitators may include content repositories and registrars. Each publisher, distributor or facilitator is provided with a unique identifier.

One embodiment relies on pre-prepared content metadata and pre-defined usage rights templates, publishing profiles and business rules to automate the publishing process. Each publisher may have usage rights templates and a set of publishing profiles. A usage rights template may define a set of usage rights that are offered to govern distribution and use of a collection of content. When a usage rights template applies to a specific content, it becomes a usage rights specification for that content. A publishing profile may describe a subgroup of distributors through which a certain type of content may be published and a subgroup of facilitators that may be used to, for example, store and register the content. Each distributor may have a set of business rules that describe how to process, filter or augment metadata and usage rights specifications supplied by a collection of publishers, repositories and registrars.

A user of the publishing system may initiate the publishing process by providing information that identifies an item of content and its metadata. The metadata may include an identifier, title, authors, publishing dates, a description and the like. The user then associates a usage rights template and a publishing profile with the content. In response to the publishing request, the system may follow the selected publishing profile to perform a sequence of actions. The system may then store the item of content to an identified content repository or media. The content may also be in a protected form such as being encrypted and the like. Repositories may include, for example, file servers, databases and the like, and media may include, for example, paper, CD, DVD, floppy disk, tape and the like. The system may then validate and register the content at the registrar, together with the associated metadata, usage rights specification and publishing profile. The system may then notify distributors of the newly available content. Upon notification, distributors may use the publisher identifier and the content identifier to automatically receive the metadata and usage rights specification of the content, automatically apply their own business rules to the metadata and usage rights specification, and automatically generate an item in their catalog which makes the content available for selection by consumers.

The invention facilitates publishing content in a networked environment. The publishing system of the invention reduces the number of human interactions that are required among the publishers, distributors and other facilitators to publish content. One embodiment of the invention uses predefined and specified information to make content items appear automatically in a distributor's consumer interface. Interfaces for the invention may include a catalog, a Web page, or a file system interface. Such an interface enables a consumer to order, download or access the content.

In one exemplary embodiment, a publisher initiates the publishing process by providing information that identifies an item of content and its metadata and associates a rights specification and a publishing profile with the item. Metadata may contain several fields including, for example, a content identifier such as an International Standard Book Number (ISBN); a title; the creator; a publisher; the publication date, a Digital Object Identification (DOI), the Library of Congress Control Number (LCCN), a description, an image and the like. The system and method of the invention may also provide a user interface for creating, modifying and managing content metadata, rights specifications, and publishing profiles. A rights specification may include information regarding the specific rights granted to an identified content if a given set of conditions is satisfied. Examples of rights specifications include: 1) the right to "view" and "print" are granted by "ABC Publishing, Inc." on content "ISBN=123456789," provided that a fee of $22.95 is paid up front; 2) the right to "view," "print" and "extract" are granted by "ABCD Publishing, Inc." on content "ISBN=123456789," provided that user is a "123 Company" employee and uses a device branded "123 Company"; and 3) the right to "view" is granted by "ABCD Publishing, Inc." on content "ISBN=123456789" for two days. However, a rights specification can include any number of various rights, and any of their associated conditions.

In response to a publishing request, the system may follow the selected publishing profile to perform a sequence of actions. Such actions may include distributing the item of content to an identified content repository such as a file server or database or to copy the content to media such as paper, tape, CD, DVD, or floppy disk, that are used to physically transport the content. The content may also be protected by encryption and the like. The system may then validate or register the content at a registrar's system together with its metadata, usage rights specification and publishing profile. The system may then notify the distributor of the newly available content, and upon notification, the distributors may use their business rules to determine whether they are interested in distributing the content and, if they are interested, the system may then use the publishing identifier and content identifier to obtain the metadata and rights specification of the content. A distributor may then apply their own distributor rules to the content and generate an item in their catalog which makes the content available to consumers.

BRIEF DESCRIPTION OF THE DRAWINGS

Exemplary embodiments of this invention will be described in detail, with reference to the following figures, wherein:

FIG. 12 shows yet another exemplary GUI for a distributor system interfacing with an embodiment of the invention for editing a catalog.

DETAILED DESCRIPTION OF EXEMPLARY EMBODIMENTS

Figure 1:
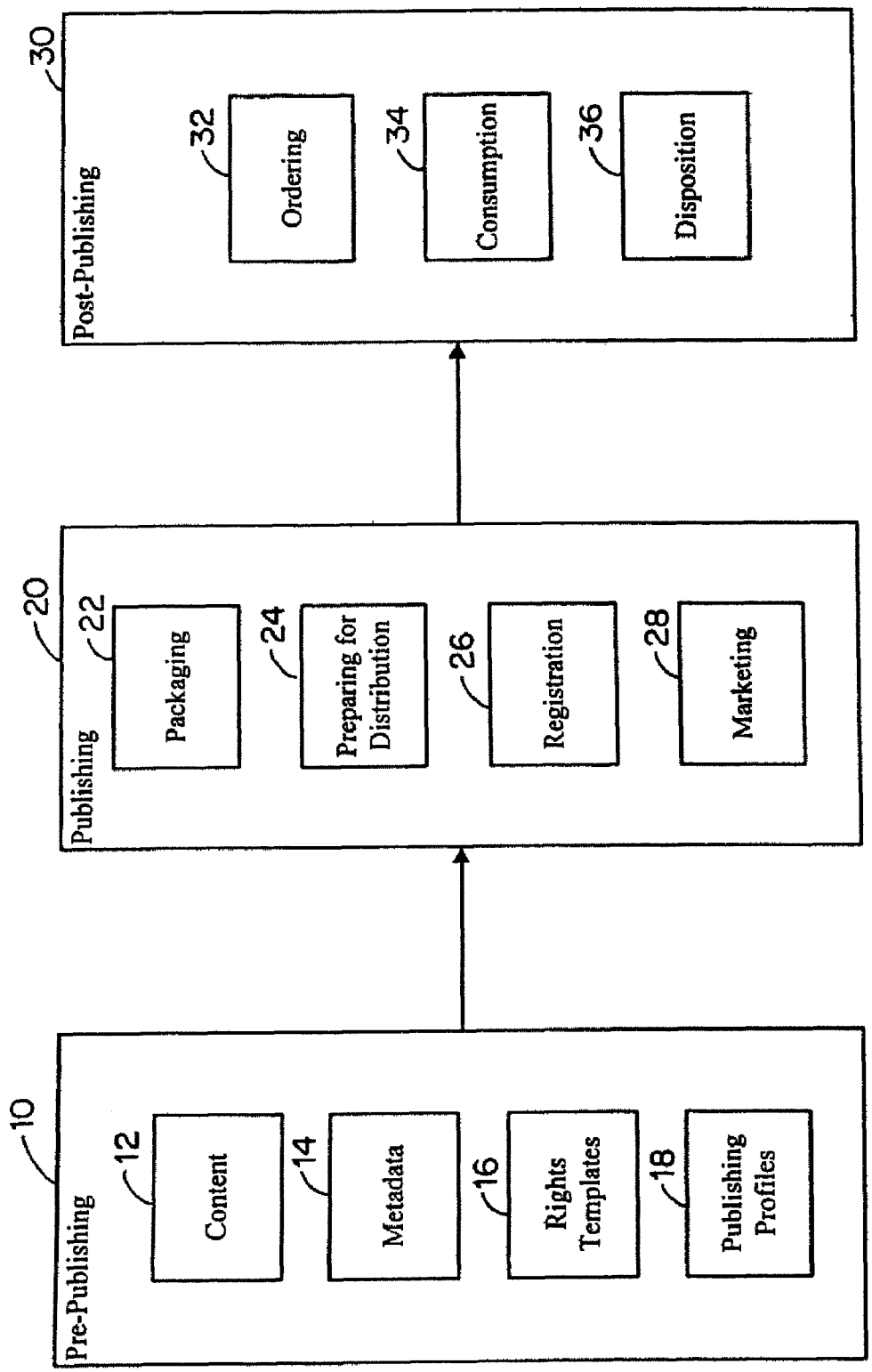
FIG. 1 is a block diagram illustrating three phases in the life cycle of content processed by an exemplary embodiment of the invention.

FIG. 1 shows a block diagram that illustrates actions that may be performed during three phases of the life cycle of content using one exemplary embodiment of the invention. All of these actions may be performed on a single system, multiple systems, a distributed processing network or any other system capable of performing these actions. The system may be inter- or intra-organizational. For example, a corporation or firm may use the invention to publish documents within the firm regardless of whether the firm operates on a LAN, WAN or the like. Pre-publishing actions 10 include creating the content 12, metadata 14, rights templates 16, and publishing profiles 18. Each of these actions 12-18 may be performed by a system in accordance with one exemplary embodiment of the invention. The system creates metadata 14 and associates the metadata 14 with the content 12. The system also can create rights templates 16. The creation of the rights templates 16 may each include creation of a set of usage rights and conditions. The creation of the rights templates 16 by this exemplary embodiment does not associate any rights with content. The system may also apply the rights templates 16 to the content 12 and the metadata 14 to generate rights specifications. The systems may also create publishing profiles 18 that each may include information related to pre-existing agreements between publishers, distributors, registrars and the like.

Publishing actions 20 may include packaging the content 22, preparing the content for distribution 24, registering the content 26 and marketing the content 28 using a system in accordance with this exemplary embodiment of the invention. The system may package the content 22 along with other data such as metadata, additional content and the like. Packaging of the content 22 may also include translating the content to a deliverable format, signing and/or encrypting the content, in association with metadata, rights specification, and other distribution and consumption enabling information, such as cryptographic keys and the like. The system may also prepare the content for distribution 24 using, for example, the metadata, the rights templates and the publishing profiles. Preparing of the content for distribution 24 may also include shipping to a content repository, printing to paper, burning onto a CD, copying to a floppy disk and tapes and the like. The system may also register the content 26 by, for example, tracking various transactions by storing a transaction record along with an associated rights specification. Registration 26 may also include forwarding metadata to a registrar. Registration of the content may also include creating and managing records of published content, together with content and identification, metadata, rights specification and other marketing information. Additionally, the system may perform a marketing function 28 by, for example, sending a notice to distributors that includes metadata, a rights specification and the like. Marketing of the content may also include cataloging, distributing and presenting the content to potential consumers, and the like.

Examples of rights templates include a template that provides: 1) the right to view and print provided that a set fee has been paid; 2) rights to view, print and extract provided the user is an employee, resides in a particular geographic area and uses a device branded by a particular company; or 3) rights to view provided that a period of time has not been exceeded and a fee has been paid. Rights templates are not limited to any specific set of rights and conditions.

The system and method of the invention may also provide a user interface for creating, modifying and managing rights templates. Such an interface may: list and or enable selection of available rights; list and/or specify conditions, and associate them with selected rights; aid the user in creating a rights template, possibly through drag- and -drop of rights and conditions into a template icon; and aid the user in verifying the syntactic and symantic correctness of templates.

A publishing profile may include a collection of distributors and facilitators through which certain types of content are distributed, archived, and registered. Publishing profiles may contain, for example, the following fields: publisher, content repositories, registrars, distributors, confirmation, and the like. The confirmation field may provide a determination on whether an on-line, an off-line confirmation or both should be obtained.

Post-publishing actions 30 may include an ordering function 32 such as a consumer placing an order for content having specific usage rights. The system may also enable a consumer to perform a consumption function 34 such as reading an e-book, listening to music, viewing artwork and the like. The system may also perform a disposition function 36 by, for example, archiving the content, destroying the content, copying the content and the like.

Figure 2:
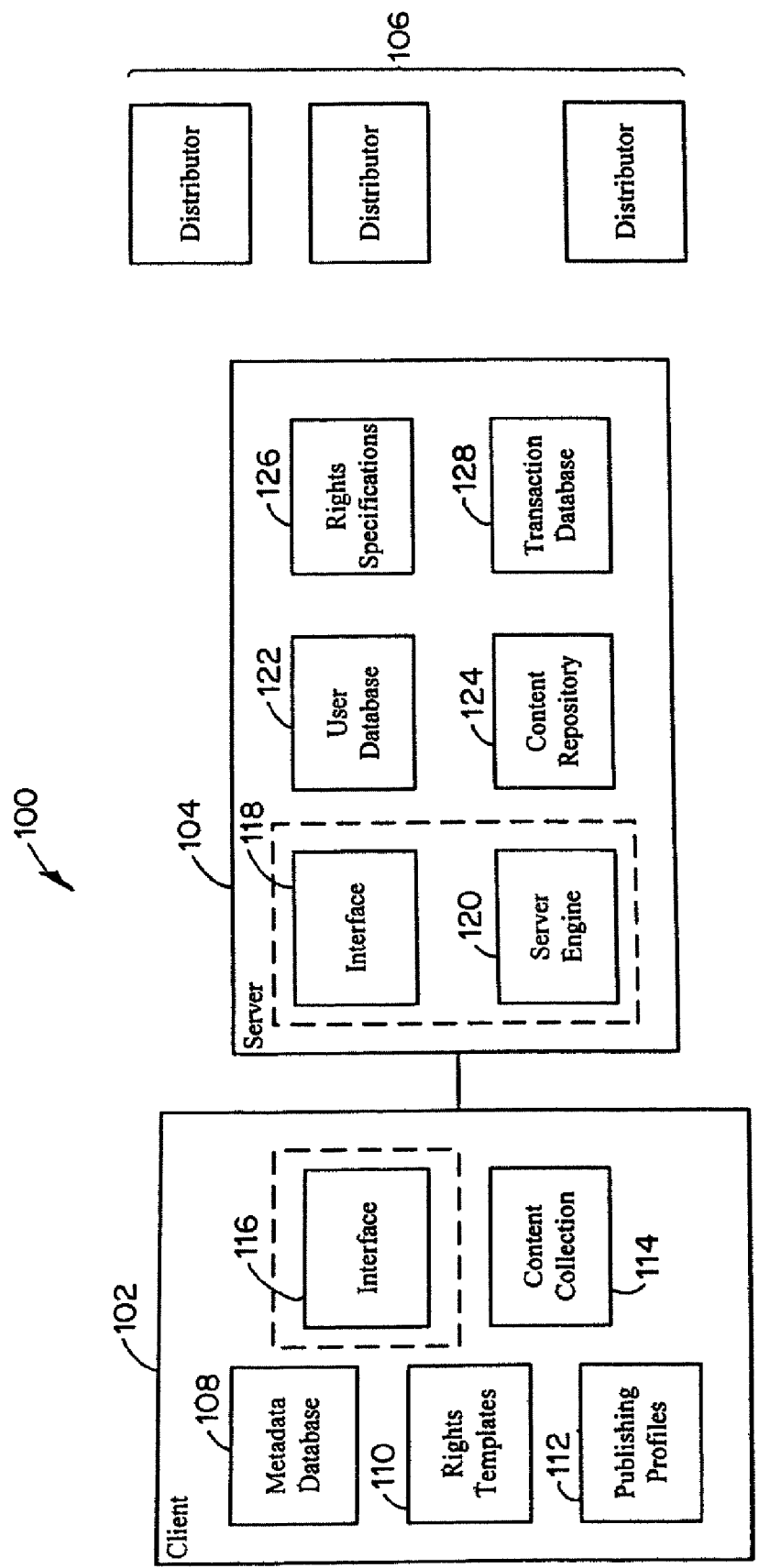
FIG. 2 is a block diagram illustrating one exemplary embodiment of a publishing system in accordance with the invention.

FIG. 2 is a block diagram illustrating one exemplary embodiment of a publishing system 100 in accordance with the invention. The publishing system 100 may include a client system 102 and a server system 104, and may selectively communicate with a plurality of distributor systems 106. The client system 102 may be accessed by a user who is a publisher, distributor, author or the like.

The client system may include a metadata database 108, a rights template database 110, a publishing profile database 112, a content collection 114, and an interface 116. A user may create, modify, edit and store metadata, rights templates and publishing profiles using the interface 116. The client system 102 is in communication with the server 104.

The server system 104 includes an interface 118, a server engine 120, a user database 122, a content repository 124, a rights specification database 126 and a transaction database 128. The user database 122 may include a user profile including data regarding each registered user of the server system 104 such as identification information, passwords and preferences for each registered user. The rights specification database 126 may include information regarding the rights specification that is associated with each content and corresponding metadata. The content repository 124 may act as a "sink" or storage location for the content after being packaged. The transaction database 128 may include data regarding each transaction or interaction with the publication system server. The transaction database 128 may also include information regarding the source and target of each distribution of content, the associated rights and conditions, billing data and any other information.

All collections, databases and repositories may be integral parts of a client, a server, or independent systems and each of them may be plural and have multiple occurrences. The content collection, metadata database, rights templates and publishing profiles may also be managed by the server system 104 or managed by one or several other servers.

As shown in FIG. 2, any of the client system 102, server system 104 and distributor systems 106 may be implemented using a programmed general purpose computer. However, the systems may also be implemented using special purpose computers, programmed microprocessors or micro controllers and any necessary peripheral integrated circuit elements, an ASIC or other integrated circuit, hardwired electronic logic circuits, discrete element circuits, programmable logic devices such as a PLD, PLA, FPGA or PAL, and the like. In general, any device capable of implementing the flow charts shown in FIGS. 3, 5-6 and 8 may be used to implement the client system 102, server system 104 and distributor systems 106. Additionally, the databases may be implemented using static or dynamic RAM. However, the databases may also be implemented using floppy disks and disk drives, writable optical disks and disk drives, hard drives, flash memory and the like. Additionally, it should be appreciated that the databases can either be distinct portions of a single database or physically distinct databases or any collection of information.

Further, it should be appreciated that communication between the client system 102, server system 104 and distributor systems 106 may be accomplished by any communications channel such as wired or wireless links to networks. These networks may be local area networks, wide area networks, intranets, the Internet, or any other network.

The method and system of the invention may also include a user registration interface (not shown) that is adapted to enable a user to register with the publishing system. Such a user interface may assist in creating, modifying and managing user information. The user information may include: name, address, phone numbers, e-mail addresses, selected publisher, financial information and the like. Each field of information may be mandatory and/or optional. The registration interface may also generate additional information for each user. Such additional information may include a unique user ID, a password that is either system assigned or user selected, crytographic keys, digital certificates and the like.

Figure 3:
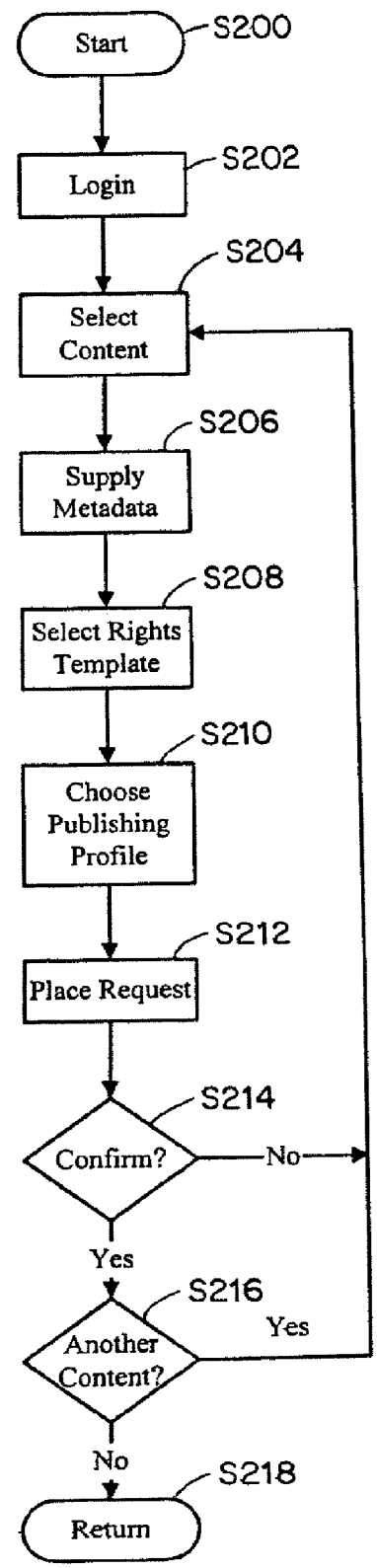
FIG. 3 shows a flow chart outlining an exemplary control routine for publishing content in accordance with the invention.

FIG. 3 shows a flow chart of a control routine that enables a user of a publishing system to publish content in accordance with an exemplary embodiment of the invention. The control routine starts at step S200 and continues to step S202. In step S202, the control routine enables the user to log in, loads a corresponding user profile and continues to step S204. In step S204, the control routine receives a selection of content and continues to step S206. The content may be selected in any conventional manner such as by dragging and dropping a content identifier, choosing the content from a list, browsing a file system or any other manner. In step S206, the control routine supplies the metadata for the selected content and continues to step S208. The metadata may be derived from the content, supplied from an existing database or created at least in part by the user. In step S208, the control routine enables the user to select a rights template or automatically selects a rights template based upon the user's profile and continues to step S210. In step S210, the control routine enables the user to choose a publishing profile or the system may automatically select a publishing profile based upon the user's profile. The control routine then continues to step S212 where the control routine enables the user to place a request for the desired content to initiate the publication process and continues to step S214. In step S214, the control routine confirms the desired content, the metadata, the rights and the publishing profile with the user. If, in step S214, the control routine receives a rejecting confirmation ("NO") from the user, then the control routine returns to step S204. If, however, in step S214, the control routine receives an accepting confirmation ("YES") of the request from the user, then the control routine continues to step S216. In step S216, the control routine determines whether publishing of additional content is desired by the user. If, in step S216, the control routine determines that publishing of additional content is desired by the user, then the control routine returns to step S204. If, however, in step S216, the control routine determines that publishing of additional content is not desired by the user, then the control routine continues to step S220. In step S220, the control routine returns control of the system to the control routine which called the control routine of FIG. 3.

Steps S204, S206, S208 and S210 may be accomplished in any order. In an alternative embodiment, the flow chart of FIG. 3 may be significantly simplified by combining steps S204 through step S210 into one or more steps. Additionally, an alternative embodiment of the control routine may omit steps S206 through S216 by determining the metadata, rights template, and/or publishing profile based upon the user's profile. The control routine may also place the request without providing for confirmation and selection of additional content. Alternatively, the control routine may omit S206 through S212 and S216. In this embodiment, the control routine will provide a single content selection along with confirmation.

Figure 4:
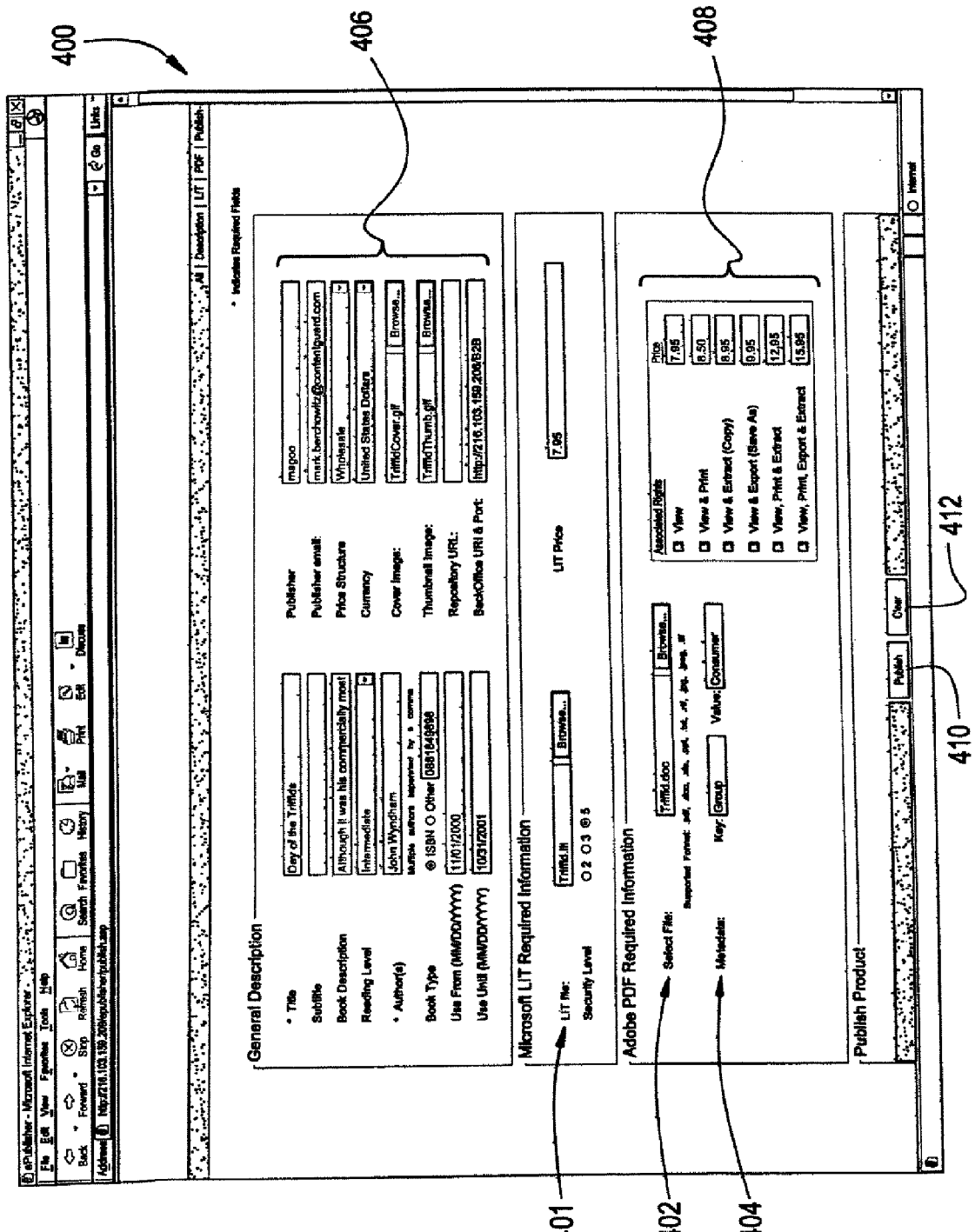
FIG. 4 shows an exemplary graphical user interface (GUI) for a user of an embodiment of the invention.

A exemplary embodiment of this invention may also provide an interface as shown in FIG. 4 for a user to publish content using a single or multiple action corresponding to the control routine of FIG. 3. As shown in FIG. 4, such an exemplary interface 400 may be a graphical user interface (hereafter "GUI") screen that includes fields to enter or select a single document or collection of documents to be published 401, 402; fields to select pre-edited metadata 406 or to compose metadata 404; fields to select a pre-specified rights template 408 or to compose a rights template (not shown); fields to select a pre-defined publishing profile or to compose a publishing profile (not shown); a button to start and complete the publishing process 410; and a button to reset all of the fields to their default values 412. Additionally, the same user interface may enable modifying and managing existing publishing requests. Also, a similar interface (not shown) may be provided for a batch processing mode to publish multiple items of content.

An optional account manager (not shown) may also be provided within a publishing process GUI. Such an account manager may be used to set and update user registration information, metadata, a default rights template and a default publishing profile. The account manager may also be used to set up mechanisms for determining metadata, a rights template and a publishing profile to be used for publishing selected content.

Figure 5:
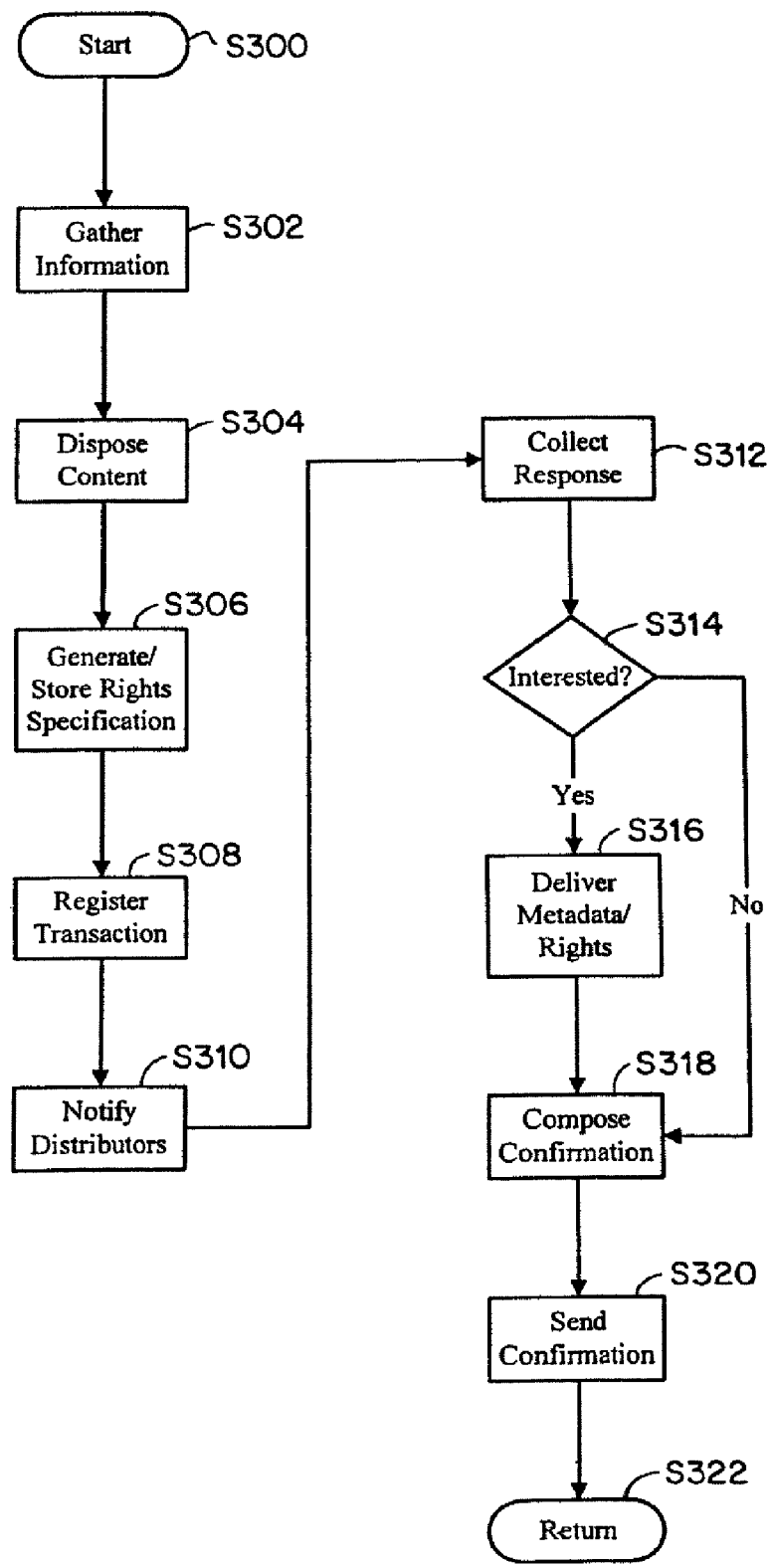
FIG. 5 shows a flow chart outlining an exemplary control routine for a "push" publishing process in accordance with the invention.

FIG. 5 shows a flow chart of one exemplary embodiment of a control routine to process a publishing request in a "push" mode in accordance with the invention. The control routine processes a publishing request and "pushes" the content to distributors. The control routine starts at step S300 and continues to step S302. In step S302, the control routine gathers information such as user information, content, metadata, rights templates, publishing profiles and the like. The control routine may use defaults, inference rules, logic analysis on content and/or any other way to gather and/or create information. The control routine then continues to step S304, where the control routine disposes the content. For example, the control routine may digitally sign and/or encrypt the content for the purpose of protection, and transfer the content to a content repository or media. The control routine then continues to step S306, where the control routine generates and/or stores a rights specification in the rights specification database 126 shown in FIG. 2 and continues to step S308. In step S308, the control routine registers the transaction in, for example, the transaction database 128 shown in FIG. 2 and continues to step S310. In step S310, the control routine notifies the distributors of the publication and continues to step S312. The notification may include, for example, a simple notice that includes a description of the content, metadata, content identifiers, publisher information, content repositories and a rights specification identifier. The distributors receive the notification and determine whether they are interested in the content based upon their business rules (discussed later). In step S312, the control routine collects the response from the distributors and continues to step S314. In step S314, the control routine determines whether a distributor is interested based upon the collected response. If, in step S314, the control routine determines that the distributor is interested, then the control routine continues to step S316. In step S316, the control routine delivers the metadata and corresponding rights specification to the distributor and continues to step S318. If, however, in step S314, the control routine determines that the distributor is not interested, based upon the collected response, then the control routine jumps to step S318. In step S318, the control routine composes a confirmation of the transaction and continues to step S320. In step S320, the control routine sends the confirmation to the user of the system and continues to step S322. In step S322, the control routine returns control of the system to the control routine that called the control routine of FIG. 5.

Figure 6:
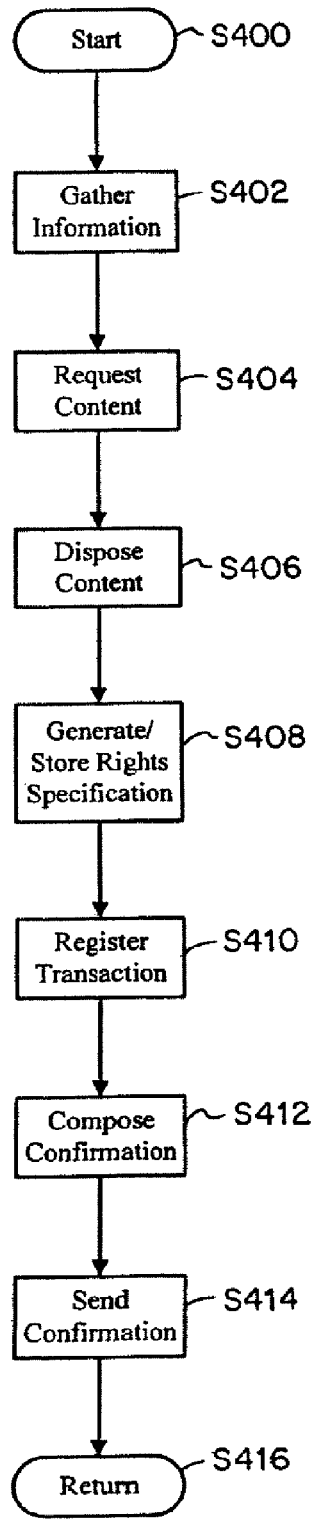
FIG. 6 shows a flow chart outlining an exemplary control routine for a "pull" publishing process in accordance with the invention.
Figure 7:
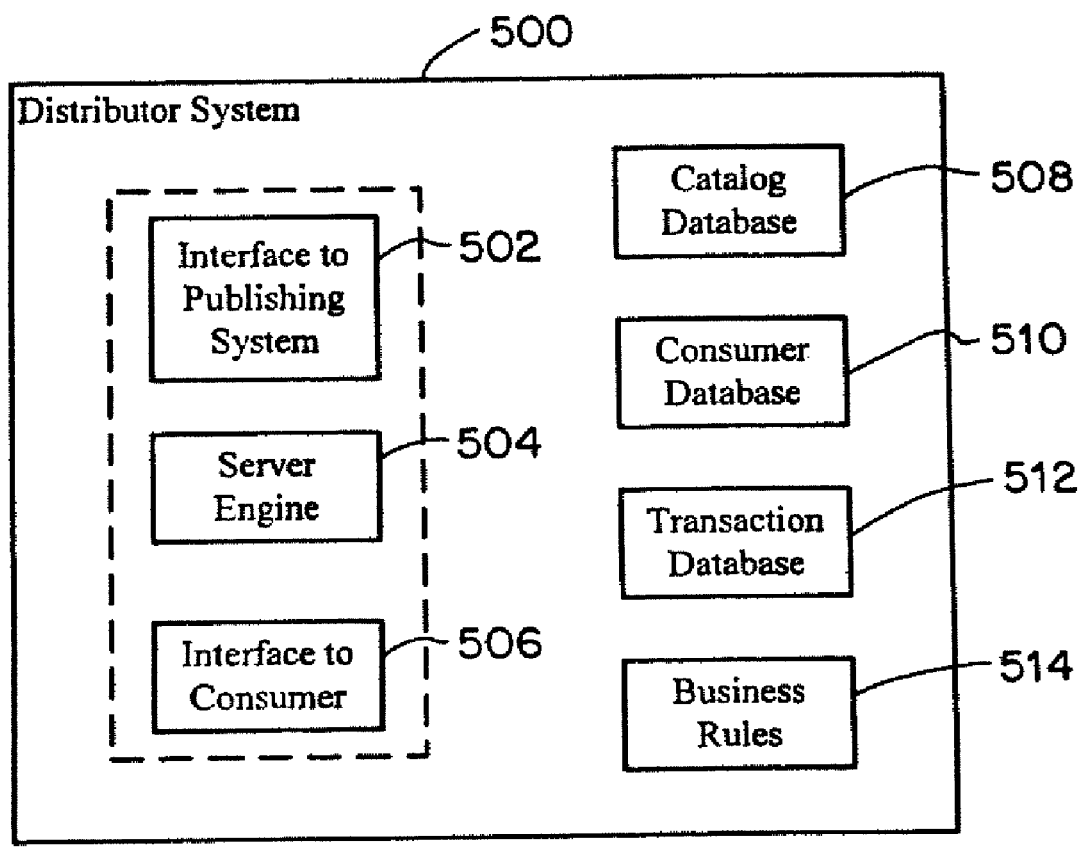
FIG. 7 is a block diagram illustrating one exemplary embodiment of a distributor system in accordance with the invention.

FIG. 6 shows a flow chart outlining one exemplary embodiment of a control routine that processes a publishing request in a "pull" mode in accordance with the invention. In other words, the control routine of FIG. 6 processes a publication request and allows distributors to "pull" the content from the system. The control routine starts at step S400 and continues to step S402. In step S402, the control routine gathers information regarding the available content and associated rights specification and continues to step S404. The gathered information may include user information, the content, metadata, a rights template, a publishing profile and the like. The information that is gathered may be determined based upon default information, inference rules, lexical analysis of the content and any other manner. In step S404, the control routine receives a request for content and continues to step S406. In step S406, the control routine disposes of the requested content and continues to step S408. In step S408, the control routine generates and stores the corresponding rights specification and continues to step S410. In step S410, the control routine registers the transaction and continues to step S412. In step S412, the control routine composes a confirmation of the transaction and continues to step S414. In step S414, the control routine sends the confirmation to the user of the system that makes the publishing request and continues to step S416. In step S416, the control routine returns control of the system to the control routine that called the control routine of FIG. 6. FIG. 7 shows a block diagram of one exemplary embodiment of a distributor system 500 in accordance with the invention. The distributor system 500 includes an interface to the publishing system 502, a server engine 504, a consumer interface 506, a catalog database 508, a consumer database 510, a transaction database 512, and a business rules database 514. The catalog database 508 may include metadata and usage rights specifications for content that have been published for distribution by the distributor. A consumer may use the consumer interface 506 to view portions of the catalog database. The consumer database 510 may include information regarding each registered consumer such as identification information, password data, preferences regarding content type, usage rights and conditions and the like. The transaction database 512 may include data regarding transactions between the distributor and publisher and between the distributor and consumers. The transaction database may also include information on each transaction such as the date, the parties, the content, the usage rights, conditions and the like. The business rules database 514 includes rules used by the distributor to conduct its business. Such rules may include content type preferences, rights and conditions, preferences and the like.

The business rules determine how a response to a publisher's notification is generated. For example, a distributor may decide that they are interested only in a specific content topic such as security. The distributor may also only grant the right to view and to filter out other rights on content that costs less than $50.00. The distributor may also decide to increase the fee for the rights by 10% of the publisher's price or $2.00, which ever is smaller. A distributor may also decide to restrict distribution from a particular publisher to users in a geographic area, such as North America. The business rules may also modify prices, for example, by setting a rental price of $1.99 per day for renting less than 5 days, and $1.49 per day for renting longer than 5 days. Business rules may be predefined and stored in the business rules database 514 on the distributor system 500.

Figure 8:
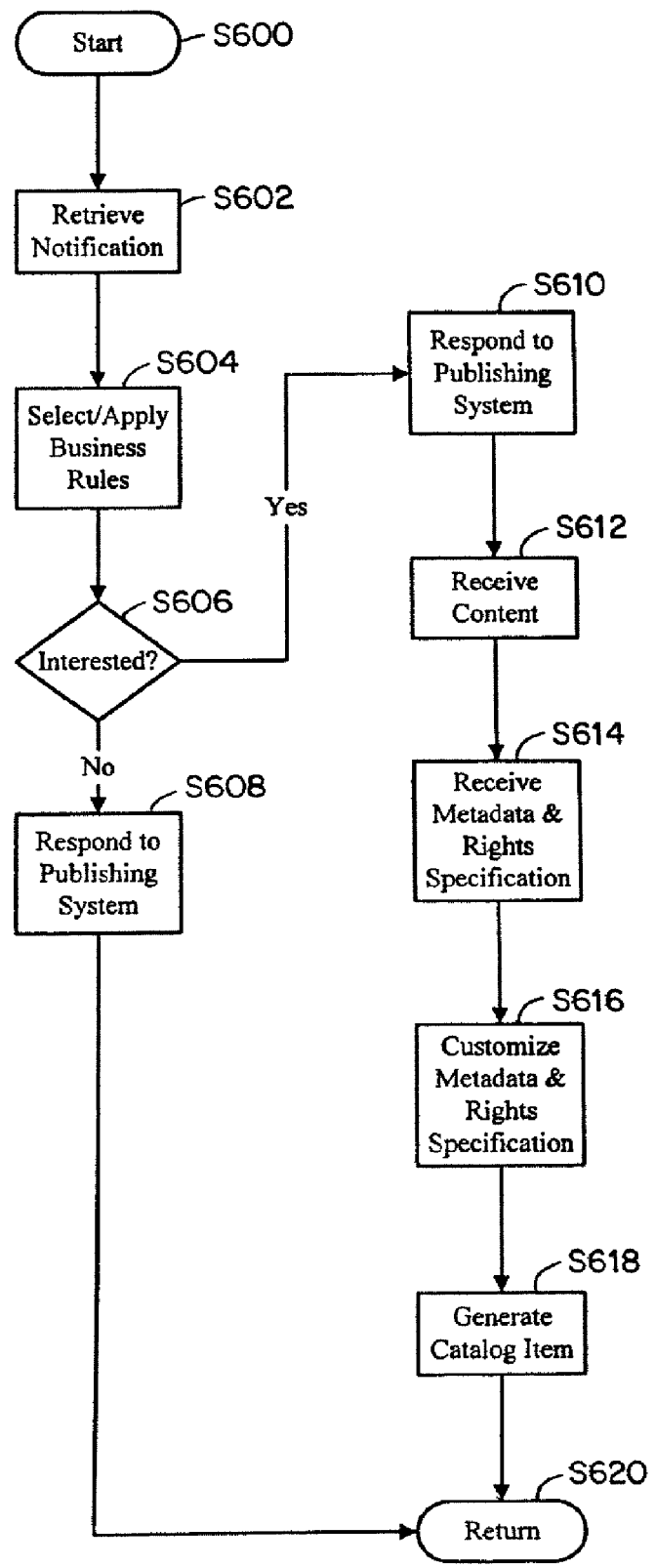
FIG. 8 is a flow chart outlining an exemplary control routine for updating a distributor catalog in accordance with the invention.

FIG. 8 shows a flow chart outlining one exemplary embodiment of a control routine to create or edit a distributor catalog in accordance with the invention. The control routine starts at step S600 and continues to step S602. In step S602, the control routine obtains a publication notice from a publishing system, by either receiving or retrieving from the publishing system depending on the "push" or "pull" mode in which the system publishes the content, and continues to step S604. In step S604, the control routine selects and/or applies the appropriate business rules to the publication notice and continues to step S606. In step S606, the control routine determines whether the distributor is interested in the particular publication using the selected business rules. If, in step S606, the control routine determines that the distributor is not interested in the published content, then the control routine continues to step S608. In step S608, the control routine responds to the publishing system with an indication that the distributor is not interested in the content and continues to step S620. If, however, in step S606, the control routine determines that the distributor is interested in the published content, then the control routine continues to step S610. In step S610, the control routine responds to the publishing system with an indication that the distributor is interested in the content and continues to step S612. In step S612, the control routine receives the content from the publisher and continues to step S614. In step S614, the control routine receives the corresponding metadata and rights specification and continues to step S616. In step S616, the control routine may customize the metadata and right specifications by, for example, adding value to the price of the content and continues to step S618. In step S618, the control routine generates a catalog item for the distributor catalog and continues to step S620. In step S620, the control routine returns control of the distributor system to the control routine that called the control routine of FIG. 8.

The flow chart of FIG. 8 may be invoked by the publishing system by a "push" or may be scheduled periodically by the distributor itself by a "pull." A distributor system, such as shown in FIG. 7, may also use the control routine outlined in FIG. 8 to periodically check a publishing system to see if new content is available. The business rules that are applied in step S604 may narrow rights and/or change conditions which result in customized rights to offer to consumers as described above. The control routine of FIG. 8 may also be modified to provide a batch mode to process multiple documents. Steps S612 and S616 are also optional. The content may be received later upon distribution.

Step S616 may modify the metadata as appropriate for the distributor and the rights specifications. In step S616, the control routine may also process the metadata in the rights specification based upon the business rules. Such customization may include granting only a view right to consumers and to filter out other rights, or to modify the sale price by some mark-up percentage. The exemplary control routine outlined in FIG. 8 may automatically enter a new item into the distributor's catalog according to processed and filtered information as received from publishers.

The system and method of the invention may also provide a business rules interface (not shown) that enables a user (e.g., a distributor) to edit the business rules. For example, the interface may provide the ability to generate business rules that identify content, modify metadata, select rights to offer, and change fees and other conditions.

The catalog item that is generated in step S618 may provide any number of identification data such as content identification, registrar identification, content metadata, content repositories, usage rights, cover page images, and the like. The interfaces shown in FIGS. 2 and 7, may each include a keyboard for entering alpha-numeric input, a cursor control device for manipulating a cursor, a display for displaying visual output and the like. The keyboard may be a standard QWERTY keyboard, but may also be a keypad or the like. The cursor control device, e.g. a mouse or trackball, will typically have a button or switch associated with it to which the performance of certain functions can be programmed.

The disclosed method and system may also be readily implemented in any combination of software and hardware. For example, object-oriented software development environments that provide portable source code that can be used on a variety of computer or workstation hardware platforms can be used to implement the invention. Alternatively, the disclosed system may be implemented partially or fully in hardware using logic circuits. The systems and methods described above, however, can be readily implemented in hardware and/or software using any known or later developed systems or structures, devices and/or software, by those skilled in the applicable art without undue experimentation from the functional description provided herein together with a general knowledge of the computer arts.

Moreover, the disclosed method and system may be readily implemented as software, executed on a programmable general purpose computer, a special purpose computer, a programmable controller and the like. In this instance, the methods and systems of the invention can be implemented as a control routine implemented on a personal computer such as a Java or CGI script as a resource residing on a server or as a routine embedded in a dedicated publishing system, a web browser, a publishing system enabled server phone, a PDA, a dedicated publishing system, and the like.

It is to be understood that the systems and methods of the invention are not limited to publishing digital content. Rather, it is to be understood that the publishing system of the invention may be used to automate at least some portion of a publishing process for any type of content and for any type of publisher. For example, the invention may be used by a conventional content publisher such as a publisher who specializes in books, e-books, music, art work and the like. The invention may also be used by any organization to manage documents such as, for example, an art museum that needs to control publication of art work regardless of whether the art work is a painting, music, sculpture or the like. In general, any type of organization may use the invention for publishing any type of content.

Figure 9:
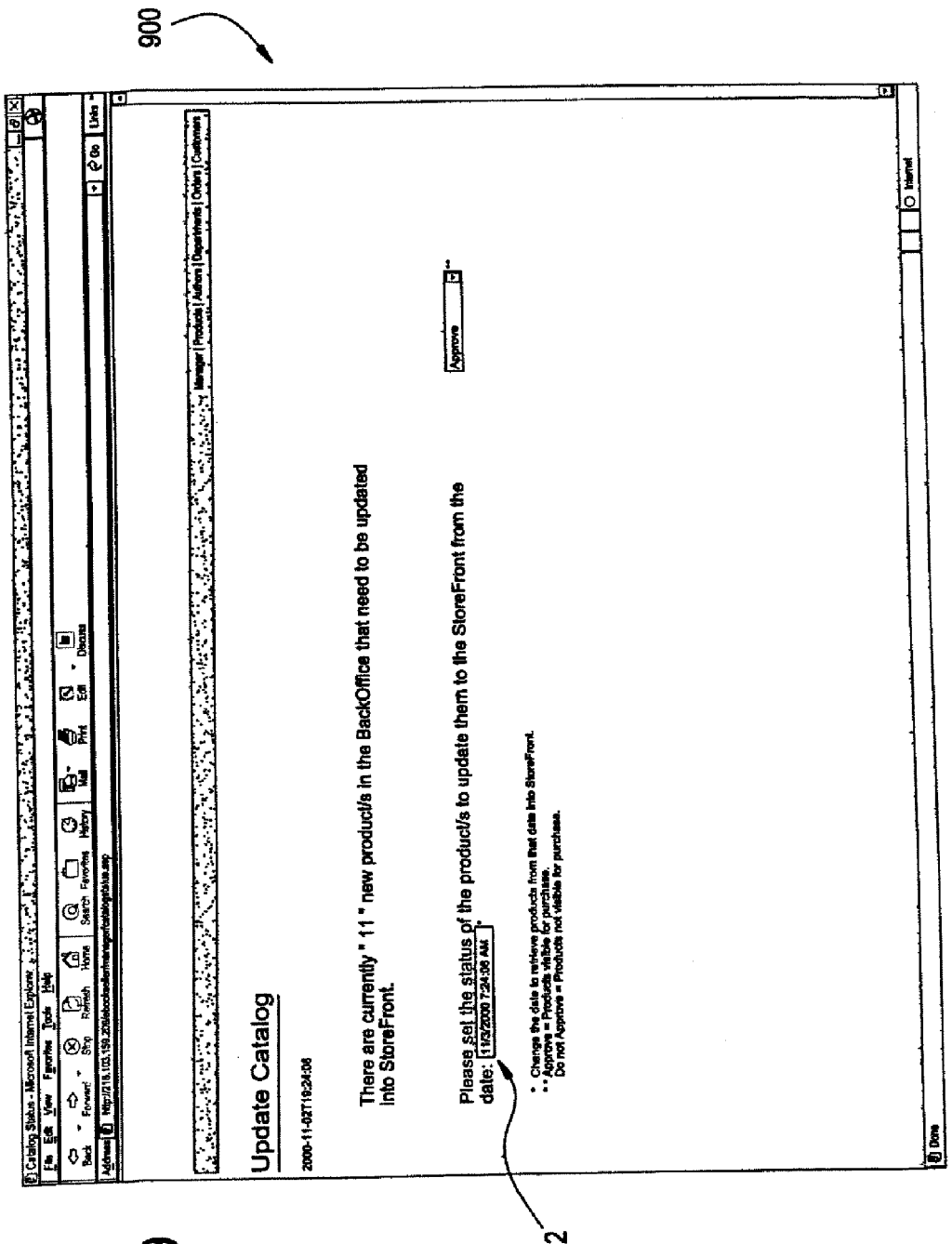
FIG. 9 shows an exemplary GUI for a distributor system interfacing with an embodiment of the invention to update a catalog.

An embodiment of the present invention may include GUI interfaces for distributors as shown, for example, in FIGS. 9-12. FIG. 9 shows an exemplary GUI 900 for a distributor system for updating the distributor's catalog or "store front." A user may select a date from which the publishing system server is queried to determine if any new content needs to be added to the catalog using a date field 902.

Figure 10:
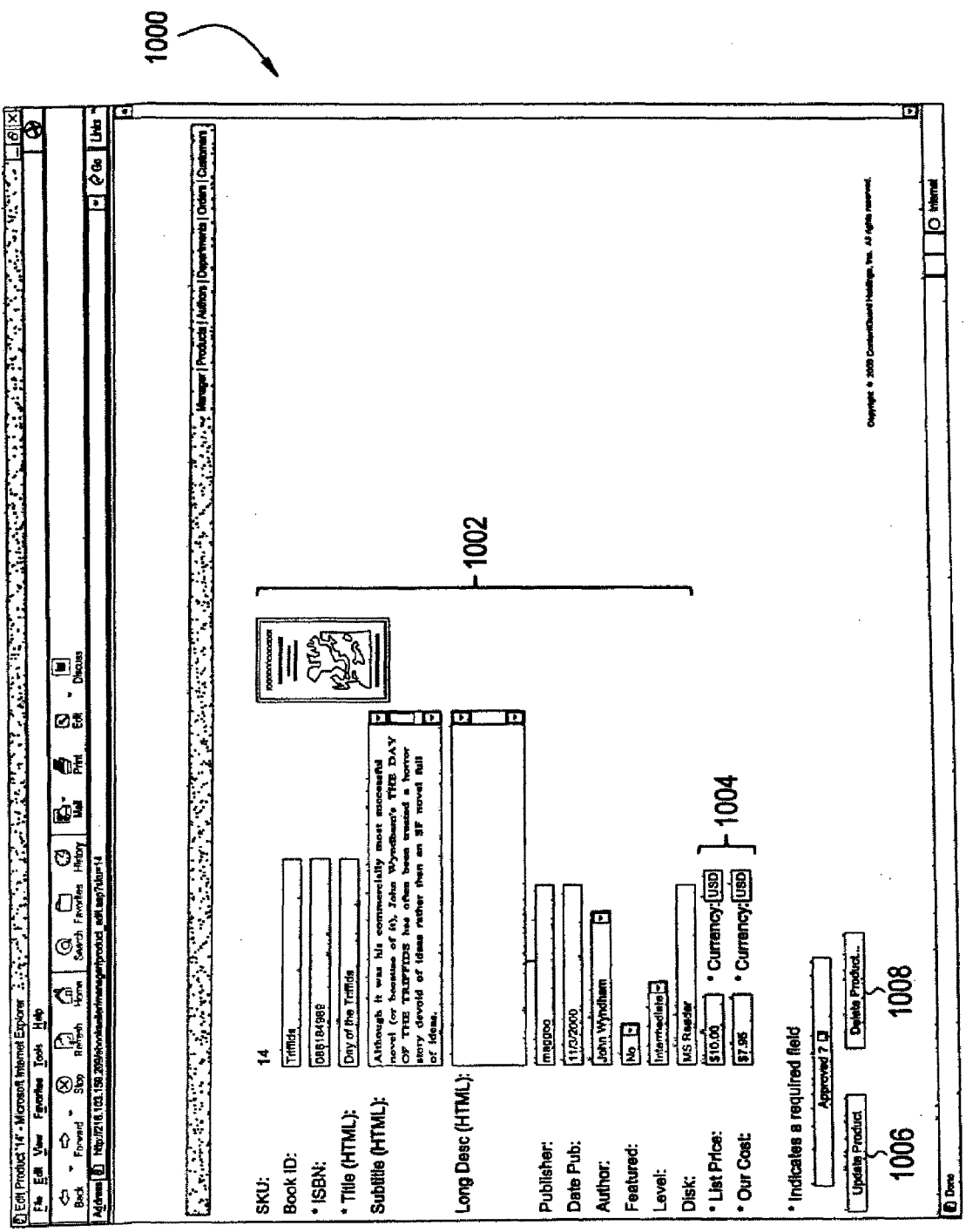
FIG. 10 shows another exemplary GUI for a distributor system interfacing with an embodiment of the invention to update a catalog.

FIG. 10 shows an exemplary GUI 1000 for a distributor system that allows a user to review a content notice and to approve or delete the content for the catalog. GUI 1000 includes fields 1002 for updating the metadata associated with the content, price and cost fields 1004, an update product listing button 1006 and a delete product listing button 1008.

Figure 11:
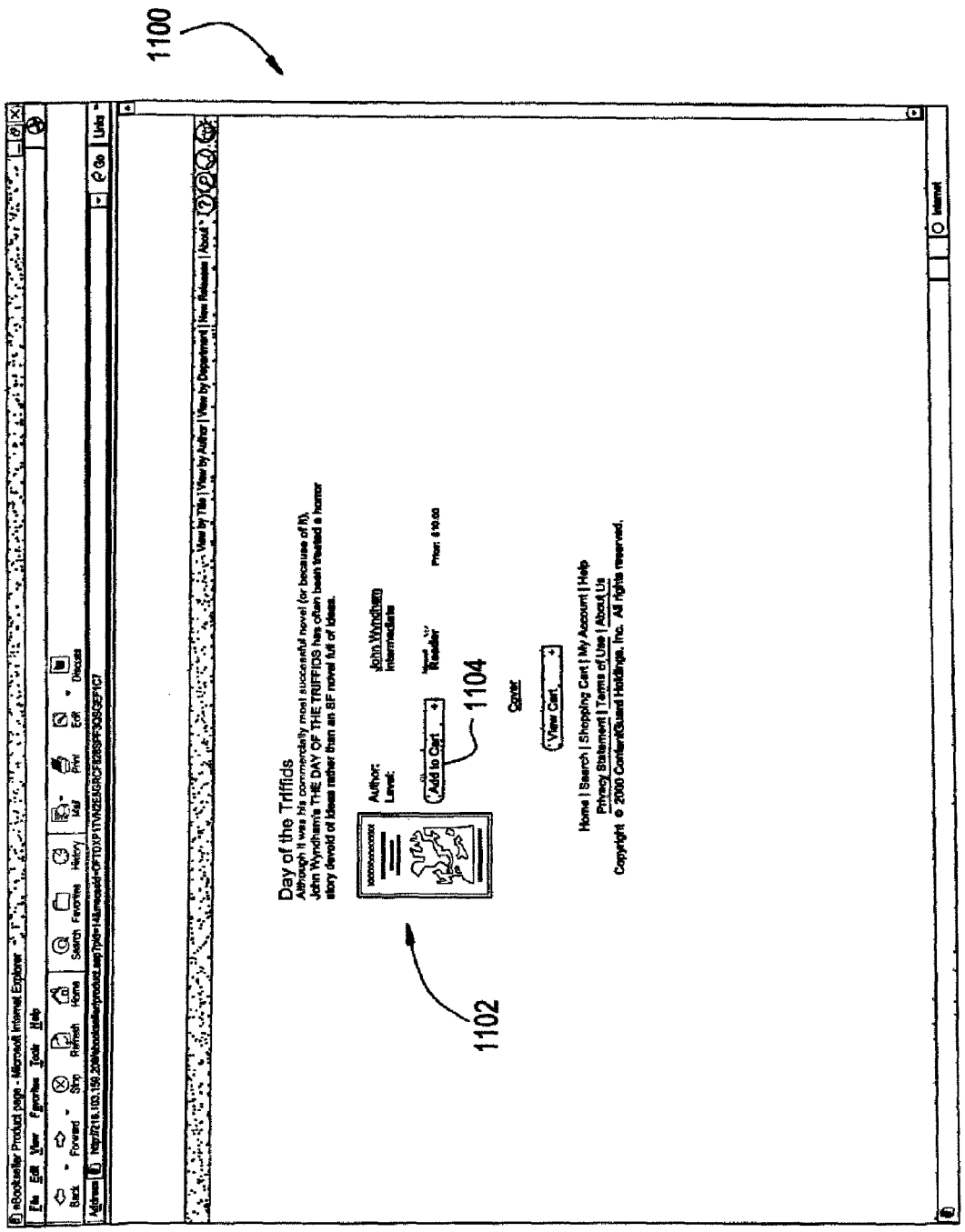
FIG. 11 shows an exemplary GUI for a distributor catalog interfacing with an embodiment of the invention.

FIG. 11 shows an exemplary embodiment of a GUI 1100 for a catalog listing 1102 of a specific content. The GUI of FIG. 11 allows a user to interact with the distributor system to receive access to content. The GUI 1100 includes a description of the content 1102 and a button 1104 that allows the consumer to purchase the content.

FIG. 12 is an exemplary GUI 1200 for a distributor system that includes content list 1202 from the distributor's catalog and provides links 1204 with which a user may select content for editing.

It is, therefore, apparent that there has been provided, in accordance with the invention, systems and methods for publishing content. While this invention has been described in conjunction with the embodiments thereof, it is evident that many alternatives, modifications and variations are apparent to those skilled in the applicable arts. Accordingly, Applicants intend to embrace all such alternatives, modifications and variations that following within the spirit and scope of this invention.

What is claimed is:

1. A method for publishing content comprising:
generating, by a publishing system, a rights specification for a content with a metadata, the rights specification including at least one of an access right, a usage right, and an accompanying condition;
generating, by the publishing system, metadata describing the content;
publishing the content in accordance with a selected publishing profile; and
providing, by the publishing system, a rights specification content identifier and the metadata to at least one distributor system in accordance with the publishing profile, thereby notifying the distributor system of the availability of the content and the rights specification, wherein the rights specification content identifier includes information identifying the rights specification, and wherein the rights specification content identifier can be used by the distributor to cause the content to be distributed for use in accordance with the rights specification or for use in accordance with a modified version of the rights specification.

2. The method of claim 1 further comprising:
processing the rights specification indicated by the content identifier according to a predefined rule;
generating a response to the notification of the distributor system based upon the processed rights specification;
delivering the metadata and rights specification to the distributor system according to the response; and
generating a catalog item in the distributor system based upon at least one of the rights specification or the metadata.

3. The method of claim 2, wherein the predefined rule comprises at least one of a content type preference, a right and condition, a preference, a content topic, and a publisher.

4. The method of claim 2, wherein the distributor system further uses a pre-defined rule to perform at least one of narrowing a right defined by the rights specification and changing a condition defined by the rights specification to produce the modified version of the rights expression including at least one of a customized right or a condition for use by the distributor system.

5. The method of claim 2, wherein generating the rights specification is based upon at least one of a user profile, a default rights specification, an inference rule, and an analysis of the selected content.

6. A content distribution system comprising:
a publishing system for creating a rights template, receiving content, creating metadata, and associating the metadata with the content; and
a control device configured to generate a rights specification by applying the rights template to the content and the metadata, wherein the rights specification including at least one of an access right, a usage right, and an accompanying condition, the control device further configured to publish the content in accordance with a selected publishing profile, provide a content identifier to at least one distributor system in accordance with the publishing profile, thereby notifying the distributor system of the availability of the content and the rights specification for distribution by the distributor, wherein the content identifier includes information identifying the rights specification, and wherein the content identifier can be used by the distributor to cause the content to be distributed for use in accordance with the rights specification or for use in accordance with a modified version of the rights specification.

7. The content distribution system of claim 6, wherein the distributor system generates a response to the notification, the response determined by processing information indicated by the content identifier according to a predefined rule, whereby the metadata and rights specification are delivered to the distributor system based on the response to the notification.

8. The content distribution system of claim 7, further comprising:
a catalog database for receiving a catalog item generated by the distributor system upon receiving the metadata and rights specification.

9. The content distribution system of claim 8, wherein the predefined rule includes at least one of a content type preference, a right and condition, a preference, a content topic, and a publisher.

10. The content distribution system of claim 8, wherein the distributor system further uses the pre-defined rule to perform at least one of narrowing a right defined by the rights specification and changing a condition defined by the rights specification to create the modified version of the rights expression having at least one of a customized right and a condition for use by the distributor system.

11. The content distribution system of claim 10, wherein the control device configured to generate the rights specification generates the rights specification based upon at least one of a user profile, a default rights specification, an inference rule, and an analysis of the content.

12. A non-transitory computer readable medium including one or more computer readable instructions embedded therein for publishing content and configured to cause one or more computer processors to perform the steps of:
- generating, by the publishing system, metadata describing the content;
- publishing the content in accordance with a selected publishing profile; and
- providing, by the publishing system, a rights specification content identifier and the metadata to at least one distributor system in accordance with the publishing profile, thereby notifying the distributor system of the availability of the content and the rights specification, wherein the rights specification content identifier includes information identifying the rights specification, and wherein the rights specification content identifier can be used by the distributor to cause the content to be distributed for use in accordance with the rights specification or for use in accordance with a modified version of the rights specification.

13. The non-transitory computer readable medium of claim 12 further comprising:
- instructions for processing the rights specification indicated by the rights specification content identifier according to a predefined rule;
- instructions for generating a response to the notification of the distributor system based upon the processed rights specification;
- instructions for delivering the metadata and rights specification to the distributor system according to the response; and
- instructions for generating a catalog item in the distributor system based upon the rights specification.

14. The non-transitory computer readable medium of claim 13, wherein generating the rights specification is based upon at least one of a user profile, a default rights specification, an inference rule, and an analysis of the selected content, and wherein the predefined rule includes at least one of a content type preference, a right and condition, a preference, a content topic, and a publisher.

15. The non-transitory computer readable medium of claim 14, wherein the distributor system further uses a pre-defined rule to perform at least one of narrowing a right defined by the rights specification and changing a condition defined by the rights specification to produce the modified version of the rights specification having at least one of a customized right and a condition for publication in a catalog.

* * * * *